US012798443B2

(12) United States Patent
Pleintinger et al.

(10) Patent No.: US 12,798,443 B2
(45) Date of Patent: Nov. 17, 2026

(54) METHOD AND SYSTEM FOR CHANGING A SEAT OCCUPANCY STATUS OF A VEHICLE

(71) Applicant: Bayerische Motoren Werke Aktiengesellschaft, Munich (DE)

(72) Inventors: Marcus Pleintinger, Bad Aibling (DE); Philipp Schweiger, Haidholzen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 131 days.

(21) Appl. No.: 18/530,441

(22) Filed: Dec. 6, 2023

(65) Prior Publication Data

US 2024/0190298 A1 Jun. 13, 2024

(30) Foreign Application Priority Data

Dec. 7, 2022 (DE) ..................... 10 2022 132 458.3

(51) Int. Cl.
*G08B 21/00* (2006.01)
*B60N 2/00* (2006.01)

(52) U.S. Cl.
CPC .......... *B60N 2/002* (2013.01); *B60N 2220/20* (2023.08)

(58) Field of Classification Search
CPC .. B60N 2/002; B60N 2220/20; B60R 16/0231
USPC .......................................................... 340/667
See application file for complete search history.

(56) References Cited

U.S. PATENT DOCUMENTS

2004/0176891 A1* 9/2004 Christl ................. B60N 2/0026 701/45
2005/0197754 A1 9/2005 Bettwieser et al.
2011/0248844 A1 10/2011 Elias et al.
2012/0232749 A1* 9/2012 Schoenberg ......... B60N 2/0022 340/457
2014/0176891 A1 6/2014 Hisada et al.
2016/0193960 A1* 7/2016 Barabas ................... B60Q 9/00 340/457
2016/0375798 A1* 12/2016 Tomatsu ........... B60R 21/01516 701/36
2020/0290567 A1* 9/2020 Funyak ................. B60R 25/102
2022/0114817 A1* 4/2022 Gronau .................. G06V 40/10
2023/0093419 A1* 3/2023 Welk ....................... B60K 35/10
2023/0406158 A1* 12/2023 Roberts ................. G01S 13/931

FOREIGN PATENT DOCUMENTS

DE 102 39 761 A1 3/2004
DE 10 2004 044 220 A1 4/2005
DE 10 2008 059 104 A1 5/2010
DE 10 2016 207 376 A1 11/2017
WO WO 03/006279 A1 1/2003

OTHER PUBLICATIONS

German Search Reprort issued in German Application No. 10 2022 132 458.3 dated Jul. 20, 2023 with partial English transiation (10 pages).

* cited by examiner

*Primary Examiner* — Mark S Rushing
(74) *Attorney, Agent, or Firm* — Crowell & Moring LLP

(57) ABSTRACT

A method is provided for changing a seat occupancy status of at least one seat of a vehicle. A control unit detects an actuation of at least one vehicle door of the vehicle and a first seat occupancy status of the at least one seat and, after a predetermined period of time after the detected actuation, changes the first seat occupancy status of the at least one seat to a second seat occupancy status of the at least one seat.

11 Claims, 2 Drawing Sheets

METHOD AND SYSTEM FOR CHANGING A SEAT OCCUPANCY STATUS OF A VEHICLE

CROSS REFERENCE TO RELATED APPLICATION

This application claims priority under 35 U.S.C. § 119 from German Patent Application No. 102022132458.3, filed Dec. 7, 2022, the entire disclosure of which is herein expressly incorporated by reference.

BACKGROUND AND SUMMARY

The seat occupancy status of a seat in a vehicle is important information for many vehicle functions. Routine sensors for detecting a seat occupancy status are, for example, pressure-sensitive mats which can be introduced into a vehicle seat.

Providing such sensors for detecting the seat occupancy status is associated with high costs, however. There is therefore a trend toward detecting the seat occupancy using sensors in the vehicle already provided for other vehicle functions. In particular, an optical sensor, such as an interior camera, in the vehicle can be used to ascertain an occupancy of the seat. It is problematic in this case that certain seats in the vehicle, for example, the seats in the rear or in a third seat row, can be partially concealed by seats in the vehicle in front of them. Optical detection of the occupancy of the seats is therefore not possible or is only partially possible.

Even if a device for determining the seat occupancy status in the vehicle is present, the determination can be erroneous. Therefore, if, in particular, no sensors are provided for detecting the seat occupancy of the seat in the vehicle, the detection of the seat occupancy is at least partially not possible, or if the sensors for detecting the seat occupancy are faulty, a valid seat occupancy status cannot be determined.

The invention therefore provides a method and a system which permit the occupancy of a seat to be determined even if no sensors for recognizing the seat occupancy in the vehicle are provided, a seat occupancy can at least partially not be determined, or the seat occupancy sensors in the vehicle are faulty.

In a first aspect, the invention provides a method for changing a seat occupancy status of at least one seat of a vehicle, wherein a control unit detects an actuation of at least one vehicle door of the vehicle and a first seat occupancy status of the at least one seat and, after a predetermined period of time after the detected actuation, changes the first seat occupancy status to a second seat occupancy status of the at least one seat.

The control unit can change the second seat occupancy status to a third seat occupancy status after a second predetermined period of time.

The control unit can change the first seat occupancy status, in particular step-by-step, after the predetermined period of time if the vehicle is in a parking mode at least for the predetermined time.

The control unit can assign the actuation of the at least one vehicle door to at least one seat of the vehicle. The control unit can assign at least the actuation of at least one vehicle door of the vehicle to the at least one seat.

The first, second, and/or third seat occupancy status can indicate the seat occupancy of the at least one seat as “unknown”, “empty”, “occupied by object”, “occupied by person”, “occupied by animal”, “occupied by child seat”, or “occupied”. In particular, the first seat occupancy status can indicate the seat occupancy of the at least one seat as unknown, occupied by object, occupied by person, occupied by animal, occupied by child seat, or occupied. The second seat occupancy status can define the seat occupancy of the at least one seat in particular as empty, unknown, and/or occupied by an object. The third seat occupancy status can define the seat occupancy of the at least one seat in particular as empty.

The control unit can change the first and/or second seat occupancy status only if the first and/or second seat occupancy status corresponds to at least one predetermined seat occupancy status.

The control unit can change a mode of operation of at least one consumer, in particular an electrical consumer, of the vehicle with each change of the seat occupancy status. The control unit can prompt a change of an operating mode of at least one consumer, in particular an electrical consumer, of the vehicle with each change of the seat occupancy status.

The control unit can change the seat occupancy status of the at least one seat if no change is detected on the at least one seat of the vehicle by an interior sensor of the vehicle during the predetermined period of time.

The control unit can change the seat occupancy status for the at least one seat if a child seat has been identified by a vehicle sensor on the at least one seat.

In a further aspect, a system for changing a seat occupancy status of at least one seat of a vehicle is provided, wherein a control unit is configured to detect an actuation of at least one vehicle door of the vehicle and a first seat occupancy status of the at least one seat, and is configured to change the first seat occupancy status to a second seat occupancy status of the at least one seat after a predetermined period of time after the detected actuation.

In still a further aspect, a vehicle is provided having a system as described herein for carrying out a method as described herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
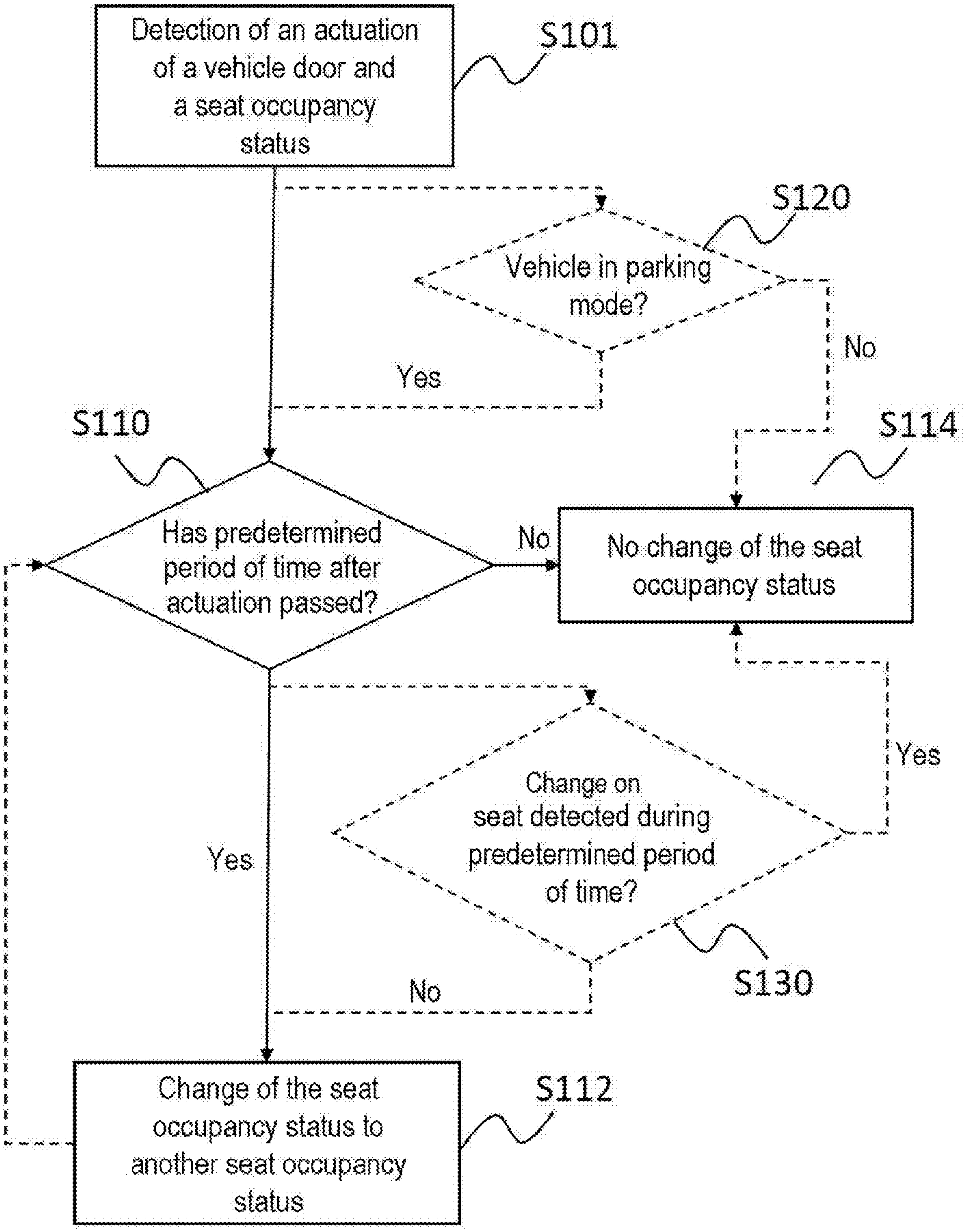
FIG. 1 schematically shows a method according to an embodiment of the invention.

A control unit is provided in a vehicle, which can first detect an occupancy for a seat of the vehicle. Moreover, the control unit can detect when a door of the vehicle is actuated, i.e., opened and/or closed. In particular an assignment between at least one seat of the vehicle and at least one vehicle door is stored here in the control unit. It can thus be defined, for example, which door actuation relates to which seat of the vehicle. In particular, the actuation of a door can be defined by the control unit as relevant for multiple seats of the vehicle. One or more seats of the vehicle can also be assigned to one door of the vehicle.

The control unit preferably detects when a door of the vehicle is closed. The control unit detects the point in time of the actuation of the vehicle door in particular when the vehicle parks or is in a parking mode. Furthermore, the control unit detects a period of time after the last actuation of the door. If a predetermined period of time has passed and a specific occupancy status is present for the seat which is associated with the door, the control unit can directly change the seat occupancy status of the seat for which the actuation of the vehicle door is relevant. In addition to occupied and empty, a type of occupancy can also be defined as the status here, namely, for example, the occupancy of a seat by an object, person, or an animal.

Depending on a current seat occupancy status, the control unit of the vehicle can change the seat occupancy status of the at least one seat. Thus, for example, after the predetermined period of time, thus when the vehicle is parked for a predetermined time, the seat occupancy status which indicates that the seat is occupied by a person can be changed to the seat occupancy status "unknown" or "empty". The predetermined period of time is dimensioned so that after it passes, it can be presumed that a person and/or an animal is no longer placed on the seat. The predetermined period of time can be, for example, in the range of 1 to 12 hours and in particular can be 4, 5, 6, 7, or 8 hours. Of course, it is also possible to define another time span which is used as the predetermined time. In one case, the predetermined period of time can be set by a user of the vehicle.

The seat occupancy status can also be changed in steps by the control unit. Thus, for example, after the first seat occupancy status has been changed, for example, from "occupied by person" to a second seat occupancy status, for example, to "occupancy unknown", in particular after the passage of a further predetermined period of time, the second seat occupancy status can be changed to a third seat occupancy status, for example, from "occupancy unknown" to "empty". The further predetermined period of time can correspond to the predetermined period of time or differ therefrom.

The seat occupancy status is used in particular to control a mode of operation of preferably electrical consumers in the vehicle and in particular to activate or deactivate them. Thus, for example, climate control functions can be operated as long as an occupancy of a seat by a person is identified. However, they can be switched off or operated in another operating mode if the seat occupancy indicates that the seat is empty or, for example, is occupied by an object.

In one example, an interior sensor, for example, an optical sensor such as an interior camera of the vehicle, cannot determine the occupancy of an at least partially concealed seat in its field of view. The status of the seat occupancy of the seat can then be changed from the first seat occupancy status, for example from "unknown", to the second seat occupancy status, for example to "empty". However, it is also possible that the seat occupancy status is changed from "person" to "object" if, for example, initially a person was assumed to be on a seat on the basis of an evaluation by the interior sensor. If, after passage of the predetermined period of time, it is determined by way of evaluation of an item of information by the interior sensor that something on the seat is still recognized, but it can be presumed that the seat-occupying element is an object, the seat occupancy status can be changed to "object". This can be the case, for example, if the interior sensor does not recognize any movement on the seat during the predetermined period of time. Of course, the seat occupancy status could also be changed from "animal" or "person" to "empty".

In another example, it is recognized by the interior sensor or other sensors used for the seat occupancy in the interior of the vehicle that a child seat is attached to the seat of the vehicle. After passage of the predetermined period of time it is then assumed that a child is no longer located in the child seat, even if a child seat is still recognized by the interior sensor or the seat occupancy sensors of the vehicle. This can be helpful, for example, if the child seat is installed counter to the direction of travel, and a view into the child seat is thus not possible due to the design of the child seat. It is then impossible for the seat occupancy sensors of the vehicle to determine, for example, whether a child is still in the vehicle.

The control unit of the vehicle is furthermore in particular designed to control consumers in the vehicle and preferably electrical consumers on the basis of the seat occupancy status or to change the mode of operation of a consumer upon a change of the first/second seat occupancy status to the second/third seat occupancy status. The control unit can thus in particular cause a climate control system of the vehicle to change to another operating mode after the predetermined period of time and, for example, to be operated with reduced intensity if, for example, the seat occupancy status is changed to "unknown" or to "empty". An illumination or the operation of a media system in the vehicle can also be operated in another operating mode and in particular deactivated after passage of the predetermined period of time.

FIG. 1 schematically shows a flow chart, using which the method according to an embodiment of the invention is described. As shown in FIG. 1, in a first step S101, a control unit detects an actuation of at least one vehicle door and a seat occupancy status of at least one seat of the vehicle. The seat occupancy status of the vehicle can be determined here, for example, on the basis of an output of the interior sensor and/or a seat occupancy sensor and in particular on the basis of optical information of an optical sensor in the interior of the vehicle.

In a second step S110, it is ascertained whether a predetermined period of time has passed since the actuation of the vehicle door. If this is the case, path "Yes", in a third step S112 a change of the first seat occupancy status to a second seat occupancy status takes place. If the predetermined period of time has not yet passed in second step S110, path "No", in a fourth step S114, no change of the first seat occupancy status to the second seat occupancy status takes place.

In an optional fifth step S120, the control unit can check whether the vehicle is in a parking mode, thus in particular is parked. This check can take place before or after the check in second step S110. In the schematic flow chart shown in FIG. 1, fifth step S120 is inserted by way of example between first step S101 and second step S110. If the vehicle is in a parking mode, path "Yes" starting from fifth step S120, the check in second step S110 can take place. Alternatively or additionally, step S120 can also take place after step S110. If the vehicle is not in a parking mode, path "No" starting from fifth step S120, then no change from the first seat occupancy status to the second seat occupancy status is likewise carried out by the control unit.

In a sixth step S130, information from an interior sensor of the vehicle which recognizes the seat occupancy in the vehicle can moreover be evaluated as to whether a change has resulted on the seat during the predetermined period of time, thus whether a change on the seat was recognized by the interior sensor. If a change on the seat of the vehicle was recognized, path "Yes" starting from the sixth step S130, no change of the first seat occupancy status to the second seat occupancy status by the control unit takes place, fourth step S114. In contrast, if no change on the monitored seat is recognized in sixth step 130, path "No" starting from sixth step S130, a change of the seat occupancy status to the second seat occupancy status takes place in third step S112.

The checks in steps S110, S120, and S130 can be executed here in the course of the method in arbitrary sequence one after another by the control unit. Moreover, it can be provided that after change of the first seat occupancy status to the second seat occupancy status in third step S112 by the control unit, the passage of a predetermined or a further predetermined period of time can again be checked and after the passage of a further predetermined period of time, a change of the seat occupancy status again takes place. A change by the control unit then preferably takes place from the second seat occupancy status to a third seat occupancy status, from a third seat occupancy status to a fourth seat occupancy status, and so on. The jump from third step S112 back to second step S110 is indicated in FIG. 1 by a dashed connection.

Figure 2:
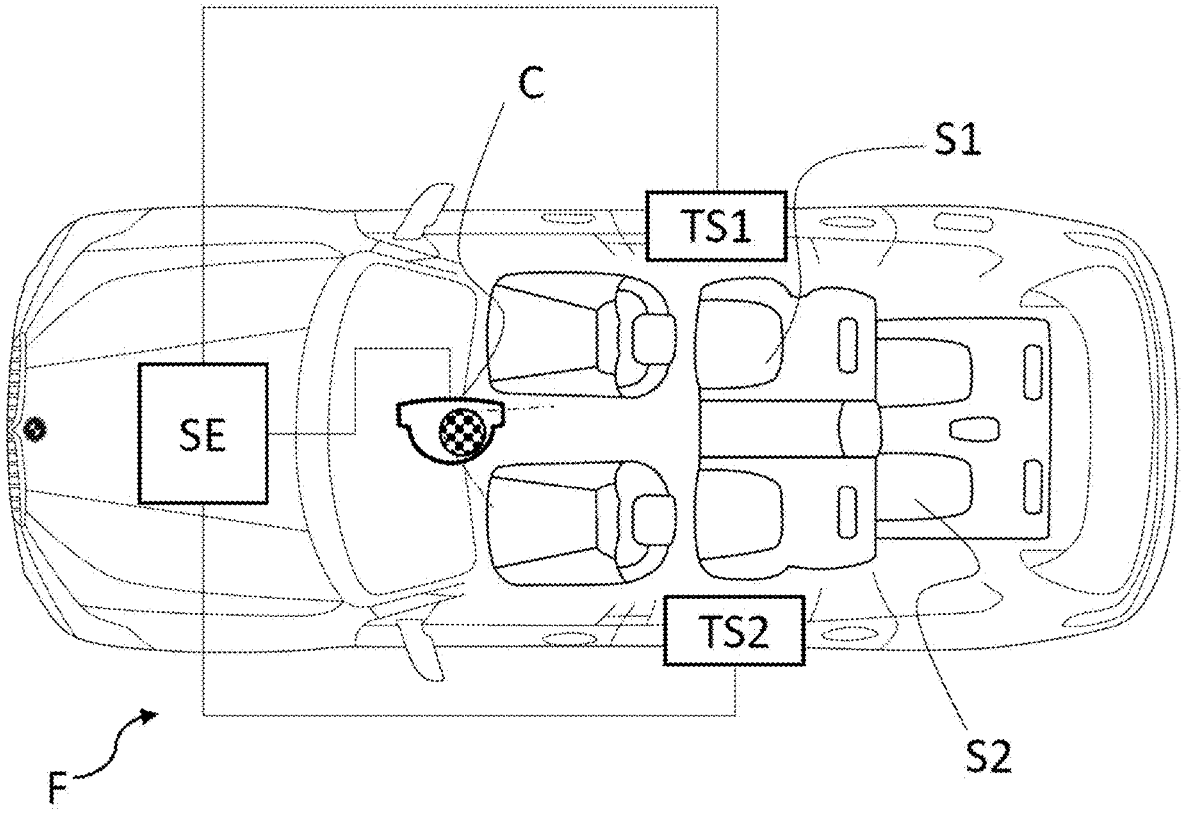
FIG. 2 schematically shows a system according to an embodiment of the invention.

FIG. 2 schematically shows a vehicle F having a control unit SE, which is configured to detect an actuation of at least one vehicle door by way of at least one door sensor TS1/TS2. A first door sensor TS1, which is assigned to a seat S1 in the rear of the vehicle F, is schematically shown in FIG. 2. Furthermore shown is a second door sensor TS2, which is assigned by way of example to a second seat S2 in a third seat row of the vehicle F. Furthermore, an interior sensor C is indicated, which is designed by way of example as an optical sensor or as an interior camera. While the interior sensor C detects the seat occupancy of at least one seat S1/S2 of the vehicle F, the first door sensor TS1 is configured, for example, to monitor an actuation of the right rear vehicle door and to output information about the actuation to the control unit SE.

The second door sensor TS2 is designed by way of example to monitor an actuation of the left rear door of the vehicle F and to output corresponding information to the control unit SE. For example, it can be ascertained by way of the interior sensor C, which can be designed, for example, as a seat occupancy sensor, during operation of the vehicle F that the seat S1 of the vehicle F is occupied. The occupancy by a person, an object, or, for example, an animal can be recognized here. If, for example, a heavy handbag is positioned on the seat S1, it can be recognized by the seat occupancy sensor TS1 that the seat S1 is occupied. If the seat occupancy status does not change after a door actuation for the predetermined period of time, while the vehicle is parked, it can be derived that a person is not located on the seat. The seat occupancy status could then be changed, for example, from "occupied" to "occupied by object".

Depending on the seat occupancy status, for example, a climate control system can be deactivated, activated, or operated with reduced or increased intensity, a media system of the vehicle can be activated or deactivated, the interior lighting of the vehicle can be controlled, or specific electrical systems or electronic systems can be put into a deep sleep mode. Moreover, alarm functions of the vehicle or parts thereof can be activated or deactivated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for changing a seat occupancy status of at least one seat of a vehicle, the method comprising:

detecting, by a control unit, an actuation of at least one vehicle door of the vehicle and a first seat occupancy status of the at least one seat; and after a first predetermined period of time beginning at the actuation, changing, by the control unit, the first seat occupancy status to a second seat occupancy status, after a second predetermined period of time beginning at the changing of the first seat occupancy status to the second seat occupancy status, changing, by the control unit, the second seat occupancy status to a third seat occupancy status, wherein the second seat occupancy status differs from the first seat occupancy status in at least one of:

whether the at least one seat is occupied, a type of occupant of the at least one seat, or whether the seat occupancy status of the at least one seat is known, and wherein the third seat occupancy status differs from the second seat occupancy status in at least one of:

whether the at least one seat is occupied, a type of occupant of the at least one seat, or whether the seat occupancy status of the at least one seat is known.

2. The method according to claim 1, wherein the control unit changes the first seat occupancy status after the first predetermined period of time when the vehicle is in a parking mode at least for the first predetermined period of time.

3. The method according to claim 2, wherein the control unit changes the first seat occupancy status step-by-step.

4. The method according to claim 1, wherein the control unit assigns the actuation of the at least one vehicle door to the at least one seat.

5. The method according to claim 1, wherein the control unit only changes the seat occupancy status when the first seat occupancy status and/or the second seat occupancy status corresponds to at least one predetermined seat occupancy status.

6. The method according to claim 1, wherein the control unit changes an operating mode of at least one consumer of the vehicle with each change of the seat occupancy status.

7. The method according to claim 1, wherein the control unit changes an operating mode of an electrical consumer of the vehicle with each change of the seat occupancy status.

8. The method according to claim 1, wherein the control unit changes the seat occupancy status of the at least one seat when no change on the at least one seat of the vehicle is recognized by an interior sensor of the vehicle during the predetermined period of time.

9. The method according to claim 1, wherein the control unit changes the seat occupancy status of the at least one seat when a child seat has been recognized by a vehicle sensor on the at least one seat.

10. A system for changing a seat occupancy status of at least one seat of a vehicle, the system comprising:

a control unit that is configured:

to detect an actuation of at least one vehicle door of the vehicle and a first seat occupancy status of the at least one seat, and after a predetermined period of time beginning at the detected actuation, to change the first seat occupancy status to a second seat occupancy status, after a second predetermined period of time beginning at the change of the first seat occupancy status to the second seat occupancy status, to change the second seat occupancy status to a third seat occupancy status, wherein the second seat occupancy status differs from the first seat occupancy status in at least one of:

whether the at least one seat is occupied, a type of occupant of the at least one seat, or whether the seat occupancy status of the at least one seat is known, and wherein the third seat occupancy status differs from the second seat occupancy status in at least one of:

whether the at least one seat is occupied, a type of occupant of the at least one seat, or whether the seat occupancy status of the at least one seat is known.

11. A vehicle comprising the system according to claim 10.

* * * * *